March 17, 1942.    J. S. PARSONS    2,276,668
NETWORK DISTRIBUTION SYSTEM
Filed March 30, 1939
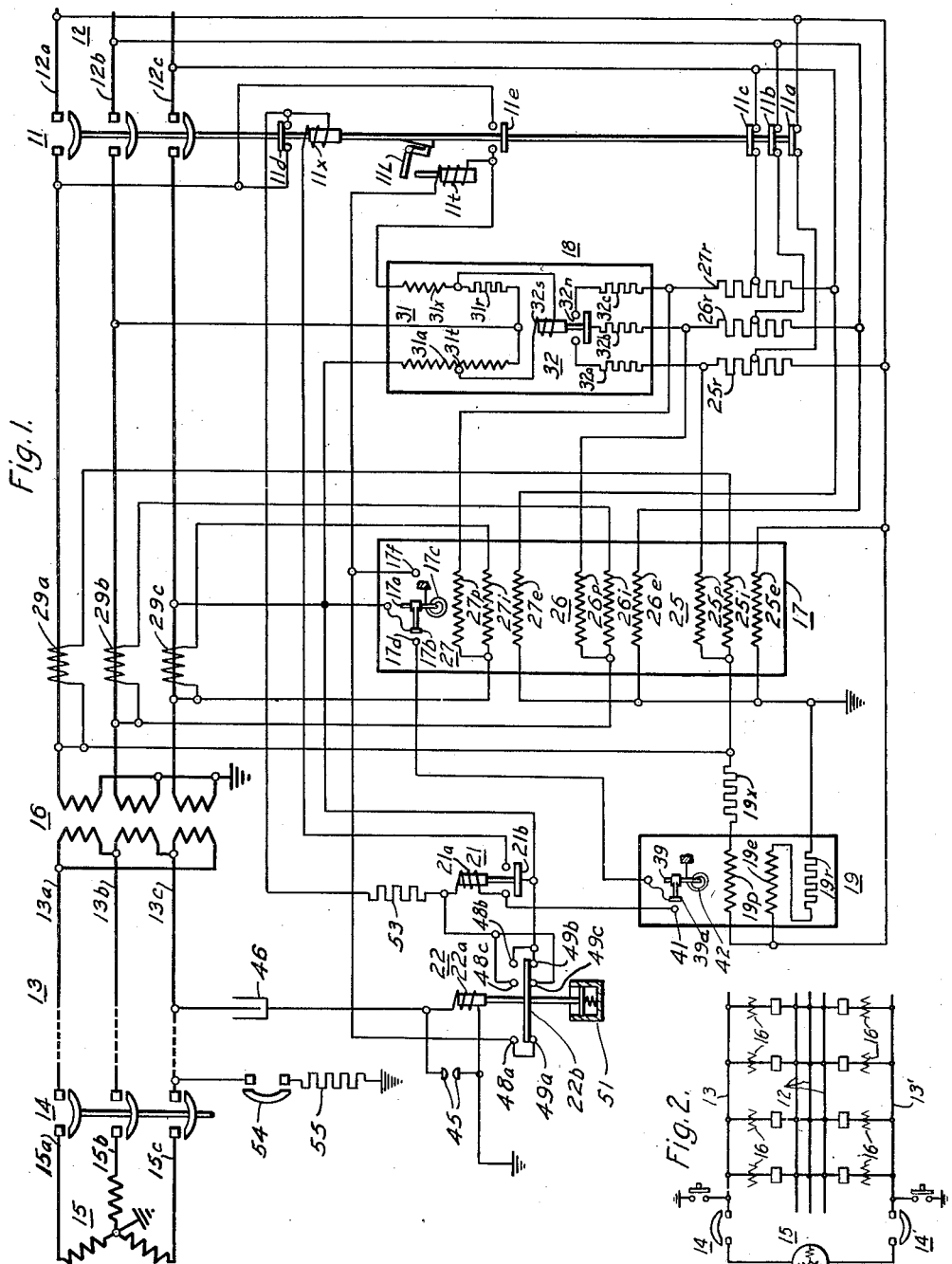
WITNESSES:
N. F. Susser
C. L. Freedman
INVENTOR
John S. Parsons.
BY J. C. Saltzman
ATTORNEY Patented Mar. 17, 1942

2,276,668

UNITED STATES PATENT OFFICE 2,276,668

NETWORK DISTRIBUTION SYSTEM

John S. Parsons, Swissvale, Pa., assignor to Westinghouse Electric & Manufacturing Company, East Pittsburgh, Pa., a corporation of Pennsylvania Application March 30, 1939, Serial No. 264,931

17 Claims. (Cl. 175—294)

This invention relates to methods of relaying alternating-current network distribution systems and has particular relation to relay systems of the directional type for controlling the operation of network protectors or circuit breakers adapted to connect the load network to a feeder circuit.

As is well known, network protectors are interposed between the transformers that step the high feeder voltage down to the low utilization voltage of the network, and feeder circuit breakers are interposed between the source of power and the feeder circuit. Directional relay equipment for controlling the operation of a network protector is effective upon the closing of a feeder circuit breaker to cause closing of the network protector if the magnitude and phase relation of the feeder voltage with respect to the network voltage are such that the protector will remain closed. In the event of a fault on the feeder or transformer, or upon the opening of the feeder circuit breaker, the directional relay equipment functions in response to the reversal of power flow, that is, power flow from the network to the feeder, to trip the network protector.

A form of directional relay equipment has been proposed which is normally insensitive but which is rendered sensitive upon the occurrence of a fault, such as a phase-to-phase or phase-to-ground fault, on the feeder. The terms "sensitive" and "insensitive" are purely relative, the former indicating, for example, that the directional relay equipment operates to trip the network circuit breaker in response to a relatively low reverse current such as 0.2% of the network protector rating, and the latter indicating that the relay equipment operates to trip the network circuit breaker only in response to a much higher reverse current. The purpose of the sensitive-insensitive arrangement is to prevent unnecessary tripping of the network protectors in response to low reverse currents of short duration caused by regenerative equipment operating on the network, or switching operations in the network.

In cases where a plurality of network protectors operate on the same feeder, it is possible that if the number of such protectors provided with sensitive-insensitive directional relay equipment is a high per cent of the total number of network protectors on the feeder, a ground fault on any of the phase lines of the feeder may fail to cause sufficiently high reverse current to exceed the insensitive setting of the relay equipment and thus fail to cause tripping of the network protectors on the feeder.

It is accordingly an object of my invention to insure the tripping of network protectors having a sensitive-insensitive directional relay control.

Another object is to control the operation of one or more network protectors from a remote point, such as at the source of power, in a novel manner.

The above objects, and other objects of my invention which will be made apparent hereinafter, are attained by means of an illustrative embodiment of my invention shown schematically in the accompanying drawing, in which:

Figure 1 is a diagrammatic view of protective equipment for a feeder on a distribution network system, and Fig. 2 is a diagrammatic view of a distribution system having a plurality of feeders.

Referring to the drawing, Figure 1, there is shown a network protector or circuit breaker 11 for connecting the phase lines 12a, 12b and 12c of a polyphase network system 12 to corresponding lines 13a, 13b and 13c of a feeder circuit 13. A feeder circuit breaker 14 having the usual automatic tripping control functions to connect the feeder lines to corresponding buses 15a, 15b and 15c of the polyphase source of power 15 indicated as star-connected with grounded neutral. A bank of single phase step-down transformers or a polyphase transformer 16, hereafter called the transformer 16, is shown illustratively with the primary windings thereof connected in delta to the high voltage feeder lines and the secondary windings thereof connected in star, with grounded neutral, to the side of the network protector opposite that to which the network lines are connected.

The network circuit breaker 11 is provided, in conventional manner as indicated diagrammatically, with a closing mechanism including a motor or solenoid 11x, a trip mechanism including a latch 11L for holding the circuit breaker in closed position and a trip coil 11t for tripping the latch to cause the circuit breaker to open. The network circuit breaker is also provided with a plurality of auxiliary contacts or switches 11a, 11b, 11c, 11d and 11e, the first four of which are back contacts and the last contact 11e being a front contact. The auxiliary contacts 11d and 11e are associated with the closing solenoid 11x and trip coil 11t, respectively, in conventional manner.

The relay equipment for controlling the closing solenoid 11x and trip coil 11t of the network circuit breaker 11 comprises a "master" or directional relay 17, a restraining relay 18 for rendering directional relay 17 sensitive or insensitive, and a phasing relay 19 adapted to cooperate with the directional relay 17 in controlling the operation of the closing solenoid 11x to close the network circuit breaker 11.

A closing relay 21 of the self-holding type is preferably provided, as shown, to avoid the necessity of the contact members of relays 17 and 19 carrying the energizing current for the closing coil 11x of the network circuit breaker as well as to insure closing of the network circuit breaker. This relay may be adjusted to close its contacts only when the voltage of the feeder to which it is connected is high enough to assure positive closing operation of the closing solenoid or motor 11x.

According to my invention, I have provided, in addition to the above equipment, a suitable voltage responsive device 22, such as an electrostatic relay, that operates in response to conditions on the high voltage feeder. The relay 22 will be described and its operation explained in detail hereinafter. Briefly, however, the relay 22 is operatively responsive to abnormally high or abnormally low voltages impressed thereon due to ground faults on the feeder lines 13a, 13b and 13c for causing tripping of the network circuit breaker.

Considering the parts of the relay equipment in greater detail, the directional relay 17 is of the polyphase induction disc or drum type, such as shown and described in detail in my prior Patents No. 1,973,097 and No. 2,013,836. This relay comprises a rotary disc or drum element (not shown) with which three separate driving magnet cores (not shown) are associated. On each magnet core is wound a group of three windings, the three groups being designated respectively by the reference numerals 25, 26 and 27. The windings of each group comprise a potential winding, a current winding and a phasing winding indicated respectively by the reference numeral of the corresponding group with the suffixes "e", "i" and "p". For example, the potential, current and phasing windings of group 25 are identified by the reference numerals 25e, 25i and 25p, respectively.

The rotary element of relay 17 is adapted, upon rotation, to correspondingly rotate spindle 17a on which is carried in insulated relation a contact member 17b. A torsion spring 17c biases the spindle in one direction to effect engagement of contact member 17b with a stationary closing contact member 17d and yieldingly opposes rotary movement of the spindle and contact member 17b in the opposite direction into engagement with a stationary trip contact member 17f that is effected in response to the torque exerted thereon by the three groups of windings.

The potential windings 25e, 26e and 27e are connected between the network lines 12a, 12b, 12c, respectively, and ground. The current windings 25i, 26i and 27i are energized according to the degree and direction of flow of the current in the respective phase lines on the secondary or low voltage side of the transformer 16 by means of suitable current transformers 29a, 29b and 29c, respectively. The phase windings 25p, 26p and 27p are connected in parallel relation with corresponding bridging contact members of the network circuit breaker that are adapted to connect the phase lines on the secondary side of the transformer 16 to the network lines 12a, 12b and 12c, respectively.

Included in series relation with the phasing windings 25p, 26p and 27p are phasing impedances shown as resistors 25r, 26r and 27r, respectively. With the network circuit breaker in open position, as shown, the auxiliary back contacts 11a, 11b and 11c shunt a portion of the resistors 25r, 26r and 27r, respectively. When the network circuit breaker is closed, the auxiliary contacts 11a, 11b and 11c are open, thus removing the shunt on the portion of the corresponding resistor and rendering the entire resistor effective to limit the current in the phasing winding to a low degree.

The three groups of current and potential windings of relay 17 are so related that when power flows from the transformer 16 to the network 12, the torque on each of the driving magnets tends to maintain the movable contact member 17b in contact with the closing contact member 17d. When power flows from the network 12 to the secondary windings of the transformer 16, the torque exerted by the driving magnets tends to rotate the spindle 17a and the contact member 17b so as to effect engagement of the contact member 17b with the trip contact member 17f.

The phasing windings 25p, 26p and 27p are so related to the corresponding current and potential windings of relay 17 that when the network circuit breaker 11 is open and the network 12 energized from other transformer banks (not shown), the torque exerted by each of the driving magnets tends to cause the movable contact member 17b to engage the closing contact member 17d, if the transformer secondary voltage is in phase with the network voltage and exceeds the network voltage by more than a predetermined amount, such as a fraction of a volt. If the component of transformer secondary voltage in phase with the network voltage fails to exceed the network voltage by the predetermined amount, the torque exerted by the driving magnets tends to cause the movable contact member 17b to engage the trip contact member 17f. A more extended and theoretical discussion of the operating characteristics of relay 17 may be had by reference to my prior Patent No. 1,973,097, if desired. The above explanation is deemed sufficient for the purpose of the present invention, however.

The restraining relay 18 comprises a positive phase-sequence filter 31, preferably of the type disclosed in Patent No. 1,936,797 to B. E. Lenehan, and a voltage responsive relay 32 associated therewith in a manner to be energized in accordance with the positive symmetrical component of the phase voltages on the secondary or low voltage side of the transformer 16.

The filter 31 comprises an auto-transformer 31a having a tap 31t for providing a voltage less than half, for example, 40%, of the total voltage impressed on the auto-transformer from one phase on the secondary side of the transformer 16, and also a reactor 31x and resistor 31r connected in series relation across another phase of the secondary side of the transformer 16 and having a combined lagging phase angle of 60° with respect to the voltage impressed thereon.

The voltage responsive relay 32 has an operating coil or solenoid 32s which is connected across the 40% tap of the auto-transformer and a tap on resistor 31r providing a voltage which is 40% of the total voltage impressed across the resistor 31r and reactor 31x and lagging it by 60°.

Assuming that the phase rotation of the phase voltages on the secondary side of the transformer 16 is in the order $a$, $b$, and $c$ corresponding to the subscripts to the feeder lines 13a, 13b and 13c, the voltage impressed on the coil of the voltage responsive relay 32 is proportional to the positive phase-sequence symmetrical components of the phase voltages of the secondary windings of the transformer 16, as explained in detail in Patent No. 1,936,797 to B. E. Lenehan, mentioned above.

The coil 32s of the voltage responsive relay 32 is designed to actuate a movable contact 32n, to closed position in response to a positive sequence symmetrical component voltage in excess of a certain percentage, such as 95%, of the balanced phase voltages on the secondary side of the transformer 16 and to permit the contact 32n to drop out to open position when the positive symmetrical component voltage is less than a predetermined minimum percentage such as 90% of the normal balanced phase voltages on the secondary side of the transformer 16.

When the voltage responsive relay 32 is actuated to its closed position, the contact member 32n connects the corresponding ends of three resistors 32a, 32b and 32c to form an artificial neutral point of a star connection. The opposite ends of the resistors 32a, 32b and 32c are connected respectively to the several junctions between the respective phasing windings 25p, 26p, 27p of relay 17 and their associated phasing resistor 25r, 26r and 27r. Thus, with the voltage-responsive relay 32 in closed position, a three-phase potentiometer is formed for applying a voltage component to each of the phasing windings of the relay 17.

With the phasing windings of relay 17 energized in this manner, a biasing or restraining torque is exerted by the driving magnets of the relay 17 which maintains the movable contact member 17b thereof firmly in contact with the closing contact member 17d. The relay 17 is accordingly conditioned thereby for insensitive operation. With the voltage-responsive relay in open position the three resistors 32a, 32b and 32c are disconnected at the artificial neutral point and the directional relay 17 is accordingly conditioned for sensitive operation.

The phasing relay 19 is preferably of the single element induction disc or drum type in which a driving magnet core is associated with the disc or drum and has wound thereon a phasing winding 19p and a potential winding 19e in the usual manner. The potential winding 19e is connected between one of the network lines, such as the line 12a, and ground in series with a resistor 19r for securing a rotated leading closing characteristic in a manner well known. The phasing winding 19p is connected in series with a suitable resistor 19x across the network circuit breaker contacts connecting the phase line on the secondary side of the transformer 16 to the network line 12a.

The rotary induction disc or drum of the phasing relay is adapted to rotate a spindle 39 in correspondence therewith, the spindle 39 having in insulated relation thereon a contact member 39a and being urged in a direction to cause the contact member 39a to engage a fixed contact member 41 under the influence of a torsion spring 42.

In order to avoid the necessity of the relatively delicate contact members of relays 17 and 19 carrying the current required to operatively energize the closing solenoid or motor 11x and insure positive closing of the network circuit breaker, the closing relay 21 is provided. As is apparent from the drawing, the operating coil 21a of closing relay 21 is connected in series relation with the closing contact members 17d and 41 of relays 17 and 19, respectively, and auxiliary contact 11d of the network circuit breaker 11 across two of the phase lines on the secondary side of the transformer 16. When operatively energized, the coil 21a actuates a contact member 21b into a closed position wherein it establishes a circuit for energizing the closing solenoid 11x of network circuit breaker 11 independently of the closing contact members of relays 17 and 19 and at the same time establishes a holding circuit for the coil thereof to maintain it energized independently of the relays 17 and 19. The circuit for energizing the closing solenoid 11x and the holding circuit for the coil 21a of the closing relay both include the auxiliary contact 11d of the network circuit breaker 11 and are deenergized by the opening thereof only after the network circuit breaker is definitely and positively closed.

The voltage responsive relay 22 which may be of the electrostatic type, comprises a suitably designed operating coil 22a, shunted by a circuit including a protective gap 45, and connected between one of the feeder lines on the high side of transformer 16, shown at 13c, and ground as through a suitable coupling capacitor 46. The coil 22a is so designed and adapted as to maintain a contact member 22b in an intermediate or "floating" position out of engagement with and between two sets of three contact members, when it is energized by the normal voltage impressed thereon, namely the normal voltage between the feeder line 13c and ground. When the coil 22a is energized by a voltage which is in excess of a predetermined voltage, such as one that is proportional to 140% of the normal voltage impressed thereon, it actuates the contact member 22b upwardly into engagement with the upper or over-voltage set of contact members 48a, 48b, and 48c. When the coil 22a is energized by a voltage which is less than a voltage proportional to, for example, 30% of the normal voltage impressed thereon, the contact member 22b is biased into contact with the lower or under-voltage set of contact members 49a, 49b and 49c.

Although the relay 22 may be replaced by an under-voltage relay which drops out when the voltage from the feeder phase conductor c to ground falls below 30% of its normal value to connect the three contacts 49a, 49b, 49c, and an over-voltage relay which picks up when the same voltage increases to a value over 140% of its normal value to engage the three contacts 48a, 48b, 48c, the "floating" type of relay appears simpler and preferable.

The movement of the contact member 22b in either direction out of its normal position is inhibited by suitable means, such as the dash pot 51 indicated, so as to delay the engagement of contact member 22b with either set of its associated contact members for a predetermined time, such as one second, following a change from the normal voltage impressed on the coil 22a to a voltage in excess of the 140% maximum or below the 30% minimum. The purpose of this time delay will be explained hereinafter.

The contact members 48a, 48b and 48c are connected to the contact members 49a, 49b and 49c, respectively, as shown. In the upper and lower positions thereof, the contact member 22b connects contact members 48a and 48b or 49a and 49b to establish a branch connection in the circuit for energizing the trip coil 11t of the network circuit breaker 11, which branch connection is in parallel with the trip contact 17f of the relay 17, thus being effective to trip the network circuit breaker open independently of the trip contact 17f of relay 17.

When the contact member 22b connects contact members 48b and 48c or contact members 49b and 49c, it establishes a shunt circuit in parallel with the operating coil 21a of closing relay 21 and the closing contacts 17d and 41 of the two relays 17 and 19, respectively, thus preventing operation of the closing relay to energize the closing solenoid or motor 11x of the network circuit breaker 11. The purpose of this shunt connection is to prevent pumping of the network circuit breaker 11, should the coil of relay 22 fail under normal conditions with power being supplied over the feeder circuit 13 to the network 12, as will be explained in further detail later.

A resistor 53 is provided in series circuit relation with the closing coil 21a of relay 21 to limit the current in this circuit and prevent a short circuit when the coil 21a is shunted by the contact member 22b of relay 22 in either its over-voltage or under-voltage position.

The operation of the apparatus is as follows, assuming that the feeder and network circuit breakers 14 and 11 are open, that the network 12 is deenergized or dead and that the various relays and switch devices are in the positions shown.

When the feeder circuit breaker 14 is closed under manual control in well known manner, the feeder lines 13a, 13b and 13c are connected to the buses 15a, 15b and 15c of the source of power 15 and the primary windings of the transformer or transformer bank 16 are energized. With the network circuit breaker 11 open, no load current flows in the secondary windings of the transformer 16 although voltage is correspondingly developed on the phase lines leading from the secondary windings to the network circuit breaker 11. The voltage between each of the phase lines on the secondary side of the transformer 16 and ground is impressed on a circuit including in series relation, a phasing winding, phasing resistor and potential winding of one of the corresponding phase winding groups 25, 26 and 27 of the direction relay 17. For example, the phasing winding 25p, phasing resistor 25r, and potential winding 25e are connected in series relation between the "a" phase line on the secondary side of the transformer 16 and ground.

If no utilization devices or translating devices, that is, transformers in other feeder circuits for the network, are connected to the dead network 12, the current in each of the phasing windings 25p, 26p and 27p is in phase with the corresponding potential windings 25e, 26e and 27e, respectively, and the torque exerted on the rotary induction disc of the relay 17 tending to shift it out of its normal position is small because of the quadrature space relation of the phasing and potential windings. If any utilization devices or translating devices are connected to the network 12, as is usually the case, they act as a partial short-circuit for the relatively high impedance potential windings 25e, 26e and 27e and thereby prevent the development of an appreciable displacing torque on the rotary disc of relay 17.

In either case, therefore, the biasing spring 17c maintains the movable contact member 17b in contact with the closing contact member 17d of relay 17. Similar considerations apply to the phasing relay 19 and the biasing spring 42 thereof maintains the movable contact member 39a in engagement with its associated stationary contact member 41.

Inasmuch as the trip coil auxiliary switch 11e of network circuit breaker 11 is open, the "a" phase voltage of the secondary side of transformer 16 is not impressed across the reactor 31x and resistor 31r of the positive phase-sequence filter 31. Thus the positive symmetrical component of the polyphase secondary system is below 95% of the balanced phase voltage, and consequently the voltage responsive relay 32 is not actuated to closed position but rather remains in its open position shown.

With the movable contact members of the directional and phasing relays 17 and 19 in contact with their respective closing contact members as just described, however, the circuit for energizing the operating coil 21a of closing relay 21 that extends from the "c" to the "a" phase line on the secondary side of transformer 16 by way of auxiliary switch 11d of the network circuit breaker, is completed and the contact member 21b thereof is accordingly actuated to its closed position for energizing the closing solenoid 11x of the network circuit breaker 11 and establishing its own holding circuit independently of the contact members of relays 17 and 19.

The network circuit breaker 11 is thus actuated to closed position and latched therein in response to the energization of the closing solenoid 11x. In its closed position, the network circuit breaker 11 connects the phase lines on the secondary side of the transformer 16 to the corresponding phase lines of the network 12, thereby energizing the network. In the closed position of the network circuit breaker 11, the trip coil auxiliary contact 11e closes the circuit impressing the "a" phase voltage of the secondary side of the transformer 16 on the reactor 31x and resistor 31r of the positive phase-sequence filter 31. The full polyphase voltage of the transformer 16 is thus applied to the filter 31 and the voltage responsive relay 32 is accordingly actuated to closed position connecting the potentiometer resistors 32a, 32b and 32c in star. As previously explained, the directional relay 17 is accordingly thereby conditioned for insensitive operation.

If a fault occurs on the network 12, it is burned clear in the usual manner. In the event that a fault occurs on the network comparatively close to the network circuit breaker so as to cause the voltage responsive relay 32 to drop out, the network circuit breaker 11 nevertheless remains closed because the direction of power is still normal, that is from the feeder circuit to the network.

If a phase-to-phase or three phase fault occurs on the feeder lines 13a, 13b and 13c, the direction of power flow reverses and a considerable reduction in the voltage of one or more phases occurs, depending upon the nature of the fault. The positive symmetrical components of the polyphase voltage on the secondary side of transformer 16 are accordingly reduced sufficiently to cause the voltage responsive relay 32 to drop out and open the star connection of the potentiometer resistors 32a, 32b and 32c. The directional relay 17 is thus conditioned for sensitive operation and the movable contact 17b thereof is operated, in response to the reverse flow of power, into contact with the trip contact 17f to effect energization of the trip coil 11t and the consequent opening of the network circuit breaker 11.

Assuming that the network 12 is energized by other transformer banks not shown, the potential windings 25e, 26e and 27e of directional relay 17 and potential winding 19e of the phasing relay 19 remain energized. As soon as the feeder circuit breaker 14 opens, in response to the operation of the usual overcurrent relay equipment (not shown), associated therewith, resulting from the fault current in the feeder lines, the voltage of the network 12 is impressed on the circuits of the phasing windings 25p, 26p and 27p of directional relay 17, as well as on the phasing winding 19p of phasing relay 19. With the network circuit breaker 11 open and the auxiliary contacts 11a, 11b and 11c shunting a corresponding portion of each of the phasing resistors 25r, 26r and 27r in series with the phasing windings 25p, 26p and 27p, respectively, an appreciable current now energizes the phasing windings of relay 17 which, in cooperation with the potential windings results in a strong torque being exerted on the rotary disc of the relay 17 to maintain the movable contact member 17b in engagement with the trip contact member 17f. In a similar manner, a torque is exerted to hold the movable contact member 39a of the phasing relay out of engagement with its associated closing contact member 41.

When the fault on the feeder circuit has been cleared or repaired and the feeder circuit breaker 14 again closed to restore the voltage on the feeder lines 13a, 13b and 13c, the movable contacts 17b and 39a of relays 17 and 19 are rotated into engagement with their respective closing contact members 17d and 41 and the network circuit breaker 11 is reclosed in the manner previously described, assuming of course the required phase-relationship and comparative magnitudes of the polyphase voltage on the secondary side of the transformer and on the network 12. Just as previously described, the closure of the network circuit breaker 11 results in the impression of the polyphase voltage of the secondary side of transformer 16 on the positive phase-sequence filter 31 and the actuation of the voltage responsive relay 32 to closed position to condition the directional relay 17 for insensitive operation.

If a ground fault occurs on any one of the feeder lines 13a, 13b and 13c, the reverse current may be sufficient to cause operation of the directional relay 17 to trip the network circuit breaker 11. However, if a plurality of other network circuit breakers (not shown) are connected in parallel relation to the network circuit breaker 11 between the feeder lines 13a, 13b and 13c and the network 12, the division of the reverse current among the plurality of network circuit breakers may be such that the reverse current through the individual network circuit breakers may be insufficient to cause tripping operation of the directional relays therefor if all or a large number of them are conditioned for insensitive operation in the same manner as is directional relay 17.

With the voltage responsive relay 22 provided as previously described, the tripping of any and all of the network circuit breakers is, however, insured.

If a ground fault occurs on either of the feeder lines 13a or 13b, the voltage impressed on the coil of the voltage-responsive relay increases approximately 73% since the phase-to-phase voltage of the source 15 is now impressed thereon instead of merely a phase-to-ground voltage. In such case, the predetermined maximum 140% overvoltage is exceeded and the contact member 22b of relay 22 is accordingly actuated upwardly into engagement with the upper or overvoltage set of contact members 48a, 48b and 48c thereof with a suitable time delay, of the order of one second, as previously indicated. This time delay is for the purpose of allowing sufficient time for the usual overcurrent relay protective equipment (not shown) associated with the feeder circuit breaker 14 to operate in response to the fault current to trip the feeder circuit breaker 14 open before any of the network circuit breakers, including circuit breaker 11 on the feeder 13 can open.

With a fault on feeder 13 and all feeder breakers closed there will be a reduction in one or more of the source bus voltages and consequently a reduction in corresponding voltage or voltages of all feeders. This might result in the opening of all network breakers 11 on both the faulty feeder and the good feeders if a time delay was not introduced in their tripping operation sufficiently long to permit the feeder breaker 14 on the faulty feeder 13 to open and relieve the low voltage condition on the good feeders.

When the contact member 22b of voltage responsive relay 22 engages its upper set of contact members, it causes energization of the trip coil 11t of the network circuit breaker 11 and the consequent opening of that breaker, in the manner previously indicated. At the same time, with the contact member 22b engaging its upper set of contact members, the operating coil 21a of the closing relay 21 is shunted, as previously explained. This effectively prevents reclosing of the first opened network circuit breaker, on a particular feeder, before all of the network circuit breakers on that feeder have tripped.

With both the feeder circuit breaker 14 and network circuit breaker 11 open, the voltage impressed on the operating coil 22a of the relay 22 decreases ultimately to zero and the contact member 22b is thus shifted into engagement with its lower set of contact members. Since the network circuit breaker 11 is already tripped open, the only effect of this operation of relay 22 is to maintain the shunt circuit around the operating coil 21a of the closing relay 21.

When the ground fault on the feeder line 13a or 13b is cleared or the line repaired, the reclosing of the feeder breaker 14 and the consequent restoration of normal voltage on the operating coil of the relay 22 causes the contact member 22b to be shifted to its normal "floating" position between and out of contact with the two associated sets of contact members, and effects the closing of the network circuit breaker 11 in the manner previously explained.

If a ground fault occurs on feeder line 13c, the voltage impressed on the operating coil 22a of relay 22 will drop below the predetermined minimum 30% of normal voltage and the contact member 22b will accordingly be shifted downwardly into engagement with its lower set of contact members 49a, 49b and 49c after a time delay of the order of one second. The feeder circuit breaker 14 and the network circuit breaker 11 are accordingly successively tripped open in the same manner just described for over-voltage operation of the relay 22.

While the shunting of the operating coil 21a of the closing relay 21 by relay 22 may serve to prevent reclosure of the first opened network circuit breaker prior to opening of the other network circuit breakers on the same feeder and thus on some systems make it possible to omit the phasing relay 19, the primary purpose of such shunting is to prevent pumping of the network circuit breaker 11 in the event that the operating coil 22a of the relay becomes open circuited under normal conditions wherein power is being supplied over the feeder 13 to the network 12.

Assuming that the coil 22a of relay 22 becomes open circuited under normal conditions, the contact member 22b is shifted into engagement with its lower set of contact members 48a, 48b and 49c just as for an under-voltage operation. The network circuit breaker 11 is thus immediately tripped open. However, since the feeder circuit 13 remains energized, the relays 17 and 19 would be effective to cause immediate reclosure of the network circuit breaker 11 but for the fact that the operating coil 21a of closing relay 21 is shunted by relay 22 and cannot therefore cause operation of the closing relay 21 to close the network circuit breaker 11. Pumping of the network circuit breaker 11 is thus prevented.

If desired, the voltage responsive relay 22 may be employed to trip the network circuit breaker 11 under remote control of the operator at the source 15 by artificially simulating a ground fault on one of the feeder lines 13a, 13b or 13c. Thus, a manually operated or controlled switch 54 may be provided at the power source 15 for grounding feeder line 13c, either through an impedance, shown as a resistor 55, or solidly.

As above explained, the relay 17 is purposely made insensitive in order to make it less responsive to reverse currents occasioned by regenerative loads, such as regenerative elevators or other equipment. Sensitivity is restored to the relay by operation of the positive sequence relay 18 which removes the restraint from the phasing windings when the positive sequence voltage drops below a predetermined value. This drop occurs on two- or three-phase feeder faults, but on a phase-to-ground fault the positive sequence voltage remains too high for the relay 18 to drop and remove the restraint from the master relay 17. In its insensitive condition, the master relay 17 usually is unable to respond to the small reverse magnetizing current, and the circuit breaker 11 fails to clear the grounded feeder 13 from the network 12.

By providing the ground relay 22, complete protection is afforded by the combination of relays. On two- or three-phase feeder faults, the master relay 17 trips the circuit breaker 11 directly or after the relay 18 operates to sensitize the master relay. On phase-to-ground faults, the ground relay 22 operates directly to trip the circuit breaker 11. When the feeder breaker 14 is opened manually, operation of the switch 54 actuates the relay 22 for tripping the circuit breaker 11.

Because of the full use of both sets of tripping contacts on the relay 22, the feeder 13 may be normally ungrounded. The ground switch 54 need be actuated only when the feeder circuit breaker is manually tripped.

In Fig. 2, the distribution circuit 12 is shown in single line as energized through a plurality of the transformers 16 from the feeder circuit 13 and from a second feeder circuit 13′ which may be connected to different sources or the same source 15 through the circuit breaker 14 and a similar circuit breaker 14′. A protective unit 68, which may be similar to the protective equipment shown in Fig. 1, is provided adjacent each transformer 16.

Certain subject matter herein disclosed is disclosed in my copending application which has matured into Patent 2,162,516, dated June 13, 1939.

It is not my intention that the present invention be restricted to the specific structural detail arrangement of parts or circuit connections set forth herein, as various omissions, additions or modifications may be effected without departing from the spirit of my invention. I do not desire, therefore, to impose any limitations on the scope of my invention except such as are required by the scope of the prior art.

I claim as my invention:

1. In an alternating-current network distribution system, a feeder circuit having a plurality of conductors, a network circuit, a transformer having its primary windings energized from the feeder circuit lines and its secondary windings arranged to be connected to the network circuit, a network circuit breaker for connecting the secondary windings of the transformer to the network, means controlled according to the voltage between one of the feeder circuit conductors and ground and effective to cause opening of the circuit breaker whenever the controlling voltage exceeds a certain abnormal high voltage or reduces below a certain abnormal low voltage, means for inhibiting the operative response of the last said means to a control voltage in excess of the abnormally high voltage or below said abnormally low voltage to delay the opening of the circuit breaker for at least a certain predetermined time, and means responsive to the direction of power flow through said circuit breaker for tripping said circuit breaker.

2. In an alternating-current network distribution system, a feeder circuit having at least two conductors, a network circuit, means including a transformer and a network circuit breaker for establishing a connection whereby power is normally supplied from said feeder circuit to said network circuit, means operatively responsive to a reversal of power to effect opening of said network circuit breaker, and means controlled according to the voltage between one of said feeder conductors and ground and operative independently of the last said means to effect opening of the circuit breaker whenever the voltage between said one feeder conductor and ground varies an abnormal amount from its normal value.

3. In an alternating-current network distribution system, a feeder circuit having a plurality of conductors, a network circuit, a network circuit breaker for establishing a connection whereby power is normally supplied from said feeder circuit to said network circuit, means effective upon energization of said feeder circuit to cause said network circuit breaker to close, means effective upon a reversal of power to cause said network circuit breaker to open, and means controlled according to the voltage between one of said feeder conductors and ground and effective independently of the last said means to cause opening of said circuit breaker whenever the voltage between said one feeder conductor and ground varies an abnormal amount from its normal value.

4. In an alternating-current network distribution system, a feeder circuit having a plurality of conductors, a network circuit, a network circuit breaker for establishing a connection whereby power is normally supplied from the feeder circuit to the network circuit, means including a switch operatively responsive to a reversal of power for causing the circuit breaker to open, and means, including a switch connected in parallel relation to the switch of the last said means, operatively responsive to an abnormal variation from the normal voltage between one of the said feeder conductors and ground for also causing opening of said circuit breaker.

5. In an alternating-current network distribution system, a feeder circuit having a plurality of conductors, a network circuit, a network circuit breaker for establishing a connection whereby power is normally supplied from said feeder circuit to said network circuit, means operatively responsive to a reverse flow of power from the network circuit to the feeder circuit for causing the network circuit breaker to open, and means controlled according to the voltage between one of the feeder conductors and ground, said last means having a certain normal position in response to the normal conductor-to-ground voltage, being operated out of its normal position to one abnormal position after the expiration of a predetermined time delay whenever the conductor-to-ground voltage exceeds a predetermined abnormal high voltage, and being operated out of its normal position to a second abnormal position after a predetermined time delay whenever the conductor-to-ground voltage reduces below a predetermined abnormal low voltage, and effective in either said one or said second abnormal positions to cause opening of the circuit breaker independently of said reverse power responsive means.

6. In an alternating-current network distribution system, a feeder circuit having a plurality of conductors, a network circuit, a network circuit breaker for establishing a connection whereby power is normally supplied from the feeder circuit to the network circuit, means effective in response to the energization of the feeder circiut for causing said network circuit breaker to close and thereby establish the connection whereby power is supplied to the network circuit, means effective in response to a reverse flow of power from the network circuit to the feeder circuit for causing said network circuit breaker to open independently of any other system condition, and means controlled according to the voltage between one of said feeder conductors and ground and effective to prevent closing of the network circuit breaker by the said closing means, unless the conductor-to-ground voltage is within a predetermined range of minimum to maximum values.

7. In an alternating-current network distribution system, a feeder circuit, a network circuit, a network circuit breaker effective when closed to establish a connection whereby power is supplied from said feeder circuit to said network circuit and when open to interrupt such supply of power, means for tripping said circuit breaker, electroresponsive means conditioned according to the relation of the voltages on the feeder circuit and the network circuit for effecting the closing of said circuit breaker, said electroresponsive means being independent of said tripping means, means for shunting said electroresponsive means to render it ineffective to cause closing of the circuit breaker when said system is not in proper operating condition, and impedance means for restricting the current flowing in said shunting means.

8. In an alternating-current network distribution system, a polyphase feeder circuit having a plurality of conductors, a polyphase network circuit, a network circuit breaker effective when closed to establish a connection whereby power is normally supplied from said feeder circuit to said network circuit, a polyphase power-directional relay, a phasing relay, a closing relay, said power-directional and phasing relays cooperating to cause operation of the closing relay to effect closing of said circuit breaker, and means controlled in accordance with the voltage between one of said feeder circuit conductors and ground for rendering said closing relay inoperative under the control of said directional and phasing relays unless the voltage between said one feeder circuit conductor and ground is within a certain range of values.

9. In an alternating-current network distribution system, a feeder circuit having at least two conductors, a network circuit, means including a transformer and a network circuit breaker for establishing a connection whereby power is normally supplied from said feeder circuit to said network circuit, means operatively responsive to a reversal of power to effect opening of said network circuit breaker and normally ineffective for a small reversal of power, and means controlled according to the voltage between one of said feeder conductors and ground and operative independently of the last said means to effect opening of the circuit breaker whenever the voltage between said one feeder conductor and ground varies an abnormal amount from its normal value.

10. In an alternating-current network distribution system, a feeder circuit having at least two conductors, a network circuit, means including a transformer and a network circuit breaker for establishing a connection whereby power is normally supplied from said feeder circuit to said network circuit, means operatively responsive to a reversal of power to effect opening of said network circuit breaker and normally ineffective for a small reversal of power, means responsive to a symmetrical component of an electrical quantity present in said system for increasing the sensitivity of said opening means, and means controlled according to the voltage between one of said feeder conductors and ground and operative independently of the last said means to effect opening of the circuit breaker whenever the voltage between said one feeder conductor and ground varies an abnormal amount from its normal value.

11. In an alternating-current polyphase network distribution system, a feeder circuit having a plurality of conductors, a network circuit, means including a transformer and a network circuit breaker for establishing a connection whereby power is normally supplied from said feeder circuit to said network circuit, means operatively responsive to a reversal of power to effect opening of said network circuit breaker, and normally restrained against operation for a small reversal of power, a positive sequence voltage filter connected for energization from said system, means responsive to a decrease in the output of said positive sequence voltage filter for removing said restraint, and means controlled according to the voltage between one of said feeder conductors and ground and operative independently of the last said means to effect opening of the circuit breaker whenever the voltage between said one feeder conductor and ground varies an abnormal amount from its normal value.

12. In an alternating-current network distribution system, a polyphase feeder circuit having a plurality of conductors, a polyphase network circuit, a network circuit breaker effective when closed to establish a connection whereby power is normally supplied from said feeder circuit to said network circuit, a polyphase power-directional relay, means controlled according to a symmetrical component of the polyphase voltage on the feeder circuit for rendering said power-directional relay unresponsive except to a reversed power current exceeding a certain value as long as the symmetrical component exceeds a certain value and responsive to a reversed power current less than said certain value when the symmetrical component is less than the said certain value therefor, said power-directional relay being effective when operated in response to reversed power to cause opening of said circuit breaker, and means controlled in accordance with the voltage between one of said feeder circuit conductors and ground, effective in response to the variation from the normal control voltage therefor resulting from a ground fault on any of said feeder circuit lines for causing said circuit breaker to open independently and regardless of operative response of the power-directional relay to power reversal.

13. In a polyphase network distribution system, a source of polyphase electrical energy, a polyphase feeder circuit breaker, a polyphase feeder circuit operatively connected to said source through said feeder circuit breaker, said feeder circuit being normally ungrounded in any position of said feeder circuit breaker, transformer means, a distribution circuit connected to said feeder through said transformer means, a circuit interrupter for disconnecting said distribution circuit from said feeder circuit, tripping means for said circuit interrupter including control means responsive independently to the deviation of a voltage difference between one conductor of said feeder circuit and ground above and below a predetermined range of values for initiating a tripping operation of said circuit interrupter, means for closing said circuit interrupter, and means controlled by said tripping control means for rendering said closing means ineffective as long as said tripping control means is in tripping condition.

14. In a polyphase network distribution system, a source of polyphase electrical energy, a polyphase feeder circuit breaker, a polyphase feeder circuit operatively connected to said source through said feeder circuit breaker, said feeder circuit being normally ungrounded in any position of said feeder circuit breaker, transformer means, a distribution circuit connected to said feeder through said transformer means, a circuit interrupter for disconnecting said distribution circuit from said feeder circuit, tripping means for said circuit interrupter including control means responsive independently to the deviation of a voltage difference between one conductor of said feeder circuit and ground above and below a predetermined range of values for initiating a tripping operation of said circuit interrupter, said tripping means being effective only after the expiration of a predetermined time from the occurrence of said deviation, means for closing said circuit interrupter, and means controlled by said tripping control means for rendering said closing means ineffective as long as said tripping control means is in tripping condition.

15. In a polyphase network distribution system, means for supplying electrical energy, a plurality of feeder circuit interrupters, a plurality of feeder circuits each connected to said means through one of said circuit interrupters, each of said circuit interrupters having means for tripping the interrupter in response to faults occurring on its associated feeder circuit, a distribution circuit, a plurality of transformers for connecting each of said feeders to said distribution circuit, a circuit breaker for each feeder circuit for operatively disconnecting the associated feeder circuit from said distribution circuit, means for tripping one of said circuit breakers responsive to the direction of power flow therethrough, and means for tripping said one of said circuit breakers responsive to a deviation of the voltage difference between one of the conductors of the feeder circuit for said one circuit breaker and ground from a predetermined range of values, said last-named tripping means being effective only after the expiration of a predetermined time following the occurrence of said deviation.

16. In a polyphase network distribution system, means for supplying electrical energy, a plurality of feeder circuit interrupters, a plurality of feeder circuits each connected to said means through one of said circuit interrupters, each of said circuit interrupters having means for tripping the interrupter in response to faults occurring on its associated feeder circuit, a distribution circuit, a plurality of transformers for connecting each of said feeders to said distribution circuit, a circuit breaker for each feeder circuit for operatively disconnecting the associated feeder circuit from said distribution circuit, means for tripping one of said circuit breakers including tripping control means responsive to a deviation of the voltage difference between one of the conductors of the feeder circuit for said one circuit breaker and ground from a predetermined range of values for initiating a tripping operation of said tripping means, said tripping means being effective only after the expiration of a predetermined time following the occurrence of said deviation, means for closing said one circuit breaker, and means controlled by said tripping control means for rendering said closing means ineffective when said tripping control means is in tripping condition.

17. In a polyphase network distribution system, a feeder circuit, transformer means, a distribution circuit connected for energization from said feeder circuit through said transformer means, a circuit interrupter for operatively disconnecting said distribution circuit from said feeder circuit, insensitive means responsive to reverse power for operating said circuit interrupter, means for increasing the sensitivity of said insensitive means responsive to the positive sequence voltage in said system, and means for operating said circuit interrupter on the occurrence of a conductor-to-ground fault on said feeder circuit.

JOHN S. PARSONS.